United States Patent
Rey et al.

(10) Patent No.: US 7,716,975 B2
(45) Date of Patent: May 18, 2010

(54) FORCE MEASURING DEVICE HAVING A RIGID STEM

(75) Inventors: Patrice Rey, St Jean de Moirans (FR); Philippe Robert, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/913,509

(22) PCT Filed: May 3, 2006

(86) PCT No.: PCT/FR2006/000996

§ 371 (c)(1), (2), (4) Date: Nov. 2, 2007

(87) PCT Pub. No.: WO2006/117480

PCT Pub. Date: Nov. 9, 2006

(65) Prior Publication Data

US 2008/0210022 A1    Sep. 4, 2008

(30) Foreign Application Priority Data

May 4, 2005 (FR) .................................. 05 04564

(51) Int. Cl.
*G01M 17/02* (2006.01)
(52) U.S. Cl. ..................................... 73/146; 152/152.1
(58) Field of Classification Search ........ 73/146–146.8; 152/152.1
See application file for complete search history.

(56) References Cited

U.S. PATENT DOCUMENTS

| | | | | |
|---|---|---|---|---|
| 4,628,583 A | * | 12/1986 | Barnett | 29/525 |
| 5,864,056 A | | 1/1999 | Bell et al. | |
| 6,417,466 B2 | * | 7/2002 | Gross et al. | 177/211 |
| 6,666,079 B2 | | 12/2003 | Poulbot et al. | |
| 7,543,490 B2 | * | 6/2009 | Rey et al. | 73/146 |
| 2005/0274189 A1 | * | 12/2005 | Oda et al. | 73/702 |

FOREIGN PATENT DOCUMENTS

| | | |
|---|---|---|
| EP | 0 549 807 A1 | 7/1993 |
| WO | WO 00/23778 | 4/2000 |

OTHER PUBLICATIONS

Integral. Oxford English Dictionary, Second Edition. 1989. Accessed online on Jun. 20, 2009. <http://dictionary.oed.com>.*

(Continued)

*Primary Examiner*—Lisa M Caputo
*Assistant Examiner*—Punam Patel
(74) *Attorney, Agent, or Firm*—Brinks Hofer Gilson & Lione

(57) ABSTRACT

A force measuring device has a rigid stem joined to an essentially flat deformable membrane. The membrane includes detectors for detecting a deformation of the membrane. A portion of the stem comes in contact with an element capable of being subjected to the action of a force. The stem has slots forming anchoring means for interacting with the element. The force measuring device is for use, in particular, in improving the transmission of loads to the deformable membrane.

17 Claims, 7 Drawing Sheets

OTHER PUBLICATIONS

Crenellate or (U.S.) crenelate. (2000). In Collins English Dictionary. Accessed online on Sep. 11, 2009. <http://www.credoreference.com/entry/hcengdict/crenellate_or_u_s_crenelate>.*
Monolithic. (2003). In the Penguin English Dictionary.*

PCT International Search Report in French and English, Aug. 8, 2006.
PCT Request in French.
PCT Written Opinion in French.

* cited by examiner

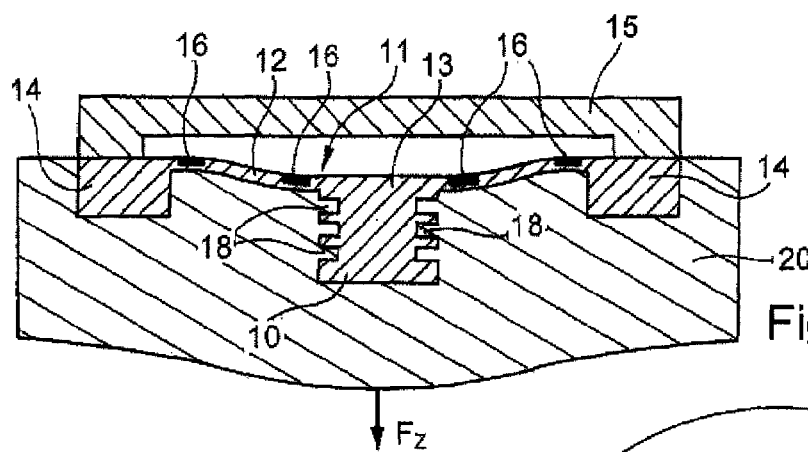
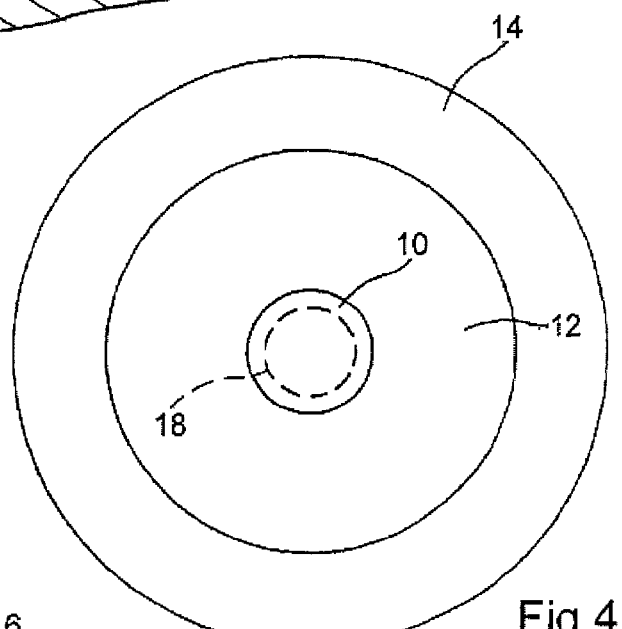
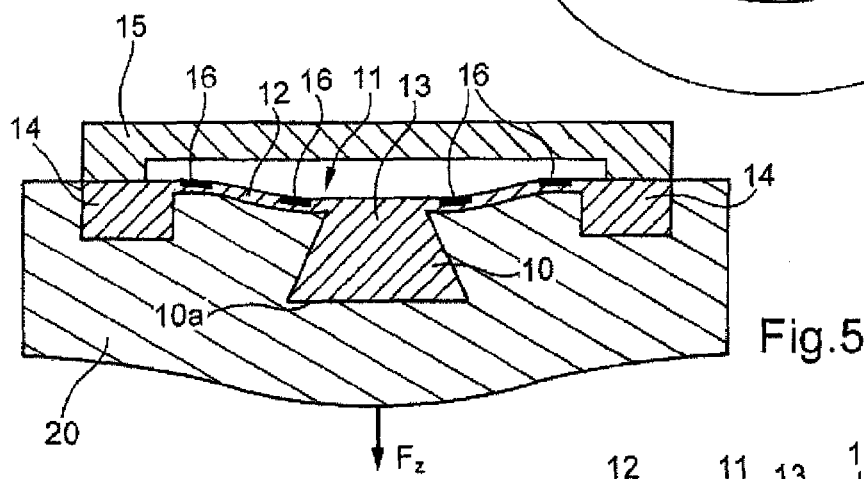
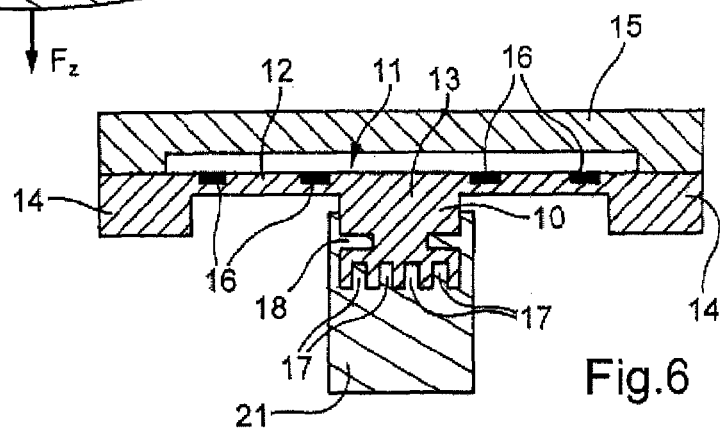

FORCE MEASURING DEVICE HAVING A RIGID STEM

PRIORITY CLAIM

This application is a U.S. nationalization of PCT Application No. PCT/FR2006/000996, filed May 3, 2006, and claims priority to French Patent Application No. 0504564, filed May 4, 2005.

TECHNICAL FIELD

The present invention concerns a force measuring device.

BACKGROUND

A sensor of any type of force (force, pressure, traction force, moment or angular or linear acceleration) can be integrated into any system in which a force is to be measured (pneumatic, video games joystick, and the like) or an acceleration is to be measured (triggering of an airbag in an automobile, pacemaker, and the like).

One such force sensor is described in U.S. Pat. No. 6,666,079, in particular.

SUMMARY

The present invention is generally concerned with a force measuring device comprising a rigid stem connected to a substantially plane deformable membrane including means for detecting a deformation of said membrane, the stem including at least a portion adapted to be in contact with an element that can be loaded by said force.

At least a portion or the whole of the rigid stem of the force measuring device is adapted to be in contact with an element able to be loaded by the force to be measured.

Thus the stem transmits the force applied to the element to the deformable membrane, the deformation whereof is proportional to the force to be measured.

An object of the present invention is to enable efficient transmission of the forces to be measured.

To this end, the present invention is directed to a force measuring device comprising a rigid stem connected to a substantially plane deformable membrane including means for detecting a deformation of the membrane, the stem including at least a portion adapted to be in contact with an element that can be loaded by the force.

According to the invention, the stem portion includes slots forming anchor means adapted to cooperate with said element.

Accordingly, in contrast to the state of the art in which the stem of the sensor generally has a smooth cylindrical shape, the slots present on at least a portion of the surface of the stem improve the adhesion of the stem to the element with which it is in contact.

This improved adhesion or anchorage achieves improved transmission of the forces, in particular when the force to which the element is subjected is a traction force that tends to separate the element from the force measuring device as well as in the case of repetitive loads.

This avoids the creation of incipient cracks in the element in contact with the sensor that can lead to errors in the measurement of the forces applied and possibly to the partial or total destruction of the element cooperating with the stem of the force measuring device.

In one embodiment of the invention, the slots are perpendicular to the membrane, thereby improving the transmission of a force tangential to the rigid stem.

Instead of this or in addition to this, the slots are parallel to the membrane, to improve the transmission of a normal force extending on the axis of the stem.

Alternatively, the anchor means are formed by an enlarged portion of the stem so that the area of contact between the stem and the element loaded by a force is increased.

The present invention is advantageously used if the stem portion is adapted to be embedded in said element loaded by the force or the stem portion is adapted to be nested in that element.

BRIEF DESCRIPTION OF THE DRAWINGS

Other features and advantages of the invention will become more apparent in the course of the following description.

In the appended drawings, given by way of nonlimiting example:

FIG. 3 is a diagrammatic view in cross section of a force measuring device conforming to a second embodiment of the invention;

FIG. 4 is a view of the force measuring device from FIG. 3 seen from below;

FIG. 5 is a diagrammatic view in cross section of a force measuring device conforming to a third embodiment of the invention;

FIG. 6 is a diagrammatic view in cross section of a force measuring device conforming to a fourth embodiment of the invention;

DETAILED DESCRIPTION

Figure 1:
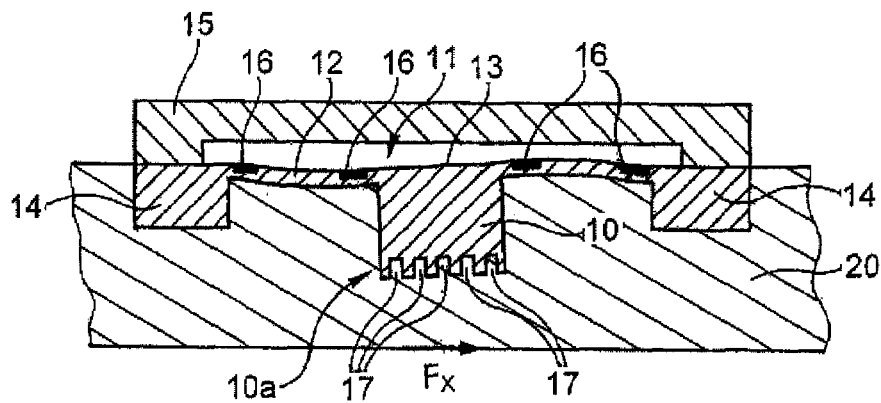
FIG. 1 is a diagrammatic view in cross section of a force measuring device conforming to a first embodiment of the invention.

A first embodiment of a force measuring device conforming to the invention will be described first with reference to FIGS. 1 and 2A.

The force sensor illustrated has a particular structure of the "nail" type. It includes a rigid stem 10 surmounted by a head 11.

That head 11 includes a substantially plane deformable membrane 12 that can be deformed if the rigid stem 10, here connected to the center of the membrane, is loaded by a force or a moment or if the complete structure of the measuring device is loaded by an acceleration, the stem then forming a seismic mass.

In this embodiment, the deformable membrane 12 is a solid circular membrane, connected to the stem 10 in a central area 13.

This deformable membrane 12 could have a different structure, and could for example be produced from different arms extending from the central area 13 to a peripheral area 14 of the membrane.

This peripheral area 14 includes anchor points that have a stable position relative to the stem 10, whether the membrane 12 is deformed or not. There is a multitude of continuous anchor points in this embodiment, extending over the peripheral area 14 of the membrane 12.

A cap 15 is also provided for covering the membrane 12 at a distance, on the side of a face opposite that carrying the rigid stem 10.

This deformable membrane 12 further includes means for detecting its deformation, for example consisting of piezo-resistive gauges 16 aligned in different directions in the plane of the membrane.

Thus these detection means can comprise eight piezo-resistive gauges disposed four by four in a double Wheatstone bridge, aligned in two perpendicular directions in the plane of the deformable membrane 12.

The imbalance measured at the terminals of the Wheatstone bridges is directly proportional to the deformation of the membrane in the direction associated with the Wheatstone bridge.

The description of U.S. Pat. No. 6,666,079 can advantageously be referred to for information regarding the detection of the deformation of the membrane and the measurement of force associated with this device.

In this embodiment of the present invention, a stem portion, here corresponding to the free end 10a of the stem 10, has a structure including anchor means 17.

Here these anchor means 17 comprise slots 17 perpendicular to the plane of the membrane 12.

Figure 2B:
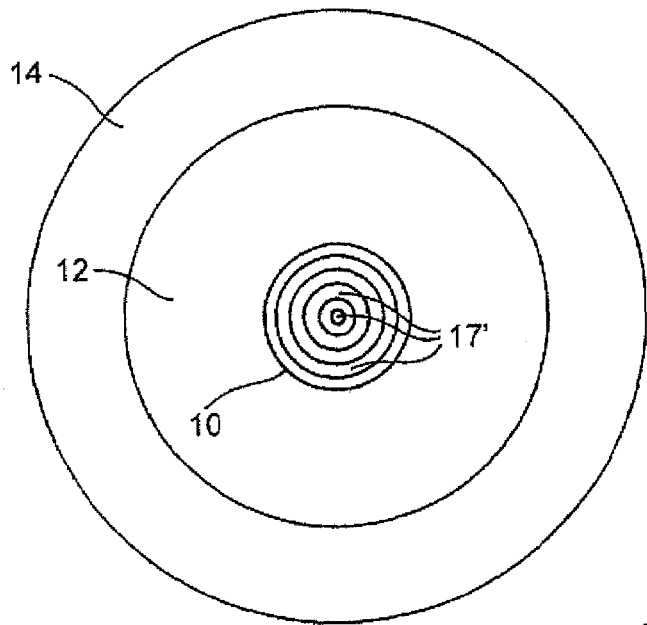
FIG. 2B is a view of an alternative embodiment of a force measuring device from FIG. 1 seen from below.
Figure 2A:
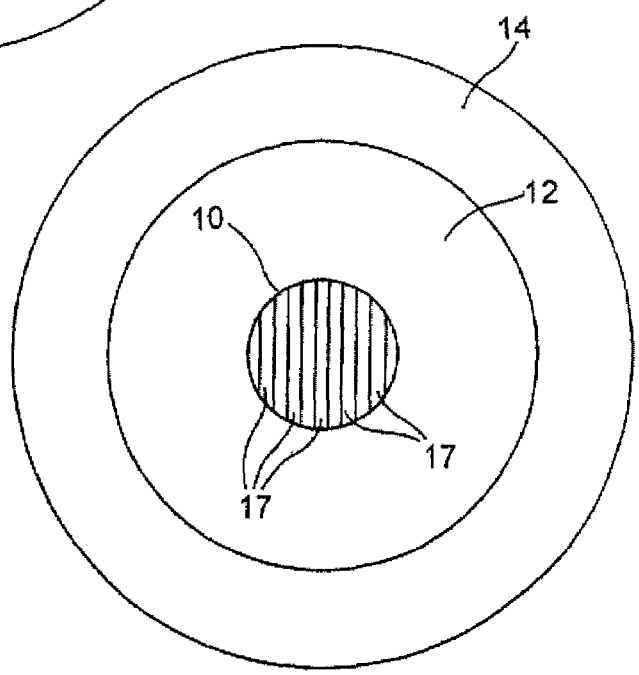
FIG. 2A is a view of the force measuring device from FIG. 1 seen from below.

As clearly shown in FIG. 2A, these slots are rectilinear and extend parallel to each other in a plane corresponding to the terminal face of the free end 10a of the stem 10.

These slots perpendicular to the membrane 12 therefore open onto the free end 10a of the stem 10. Thus they form grooves of square or rectangular cross section that open onto the terminal face of the free end 10a of the stem.

In this embodiment, where at least the free end 10a of the stem is adapted to be embedded in an element 20, these slots 17 improve the anchoring of the stem 10 in this element 20.

FIG. 1 illustrates the force measuring device in which the entirety of the device, that is to say the head 11 and the stem 10 of the sensor are embedded in the material of the element 20. In this FIG. 1, the element 20 is loaded by a force $F_x$ tangential to the axis of the stem 10.

The force to which the element 20 is subjected can therefore be transmitted perfectly to the stem 10 thanks to the adhesion and to the anchorage improved by the presence of the slots 17. These slots 17 extend perpendicularly to the plane of the membrane 12, and the anchorage is particularly improved when the force applied to the element 20 extends in the plane of this membrane 12.

These slots could have a different shape. Accordingly, as illustrated in FIG. 2B, the slots 17' can be concentric circles opening onto a face, here the terminal face, of the free end 10a of the stem 10.

The depth of the slots 17, 17' must not weaken the stem which must remain rigid when acted on by the applied forces. Here a depth of the order of one quarter of the length of the stem 10 is a correct value.

A second embodiment of the invention is described next with reference to FIGS. 3 and 4.

The elements identical to the embodiment described hereinabove, and carrying the same reference numbers, are not described again in detail here.

In this embodiment, the stem 10 includes in its height anchor means 18 that are formed of slots parallel to the plane of the membrane at rest.

As shown clearly in FIG. 4, these slots are annular and open onto the perimeter of the cylindrical rigid stem 10. In this embodiment, three circular slots 18 are superposed on the longitudinal axis of the stem 10.

These slots 18 are formed of annular grooves of square or rectangular cross section one side whereof opens onto the longitudinal wall of the stem 10.

Of course, a single slot could be produced in the body of the stem 10, or a number equal to two or greater than three.

The slots 18 open onto the longitudinal wall of the stem 10, and these anchor means are particularly suitable for transmitting a force to the membrane 12 when the force $F_z$ loading the stem 10 is normal, i.e. on the axis of the stem 10, perpendicularly to the membrane 12.

Here also, the depth of the slots in the thickness of the stem must not weaken the latter.

In FIG. 3 the sensor is illustrated buried in an element 20, the latter being loaded by a traction force $F_z$ tending to separate the element 20 from the stem 10.

The anchorage of the stem 10 in the element 20 is improved by the presence of the slots 18.

A third embodiment is described next with reference to FIG. 5, elements common to the preceding embodiments carrying the same reference numbers.

In this embodiment, the stem is structured so that the anchor means are formed by an enlarged portion of the stem 10.

Here this enlarged portion has a frustoconical shape, the enlarged base of the frustum constituting a free end 10a of the stem 10.

In this embodiment, in which the sensor is buried in an element 20, when the loading force $F_z$ is perpendicular to the membrane 12, this enlarged portion of the free end 10a of the stem provides a mechanical anchorage favorable to the transmission of the force to the membrane 12.

In the preceding embodiments, there is illustrated a sensor entirely buried in an element 20, for example in a flexible rubber type material.

Of course, only the stem 10, or the free end 10a of the stem 10 could be buried in the element 20.

A fourth embodiment is described next with reference to FIG. 6, elements common to the preceding embodiments carrying the same reference numbers.

In this embodiment, the stem 10 comprises anchor means consisting both of slots 17 perpendicular to the membrane 12 and slots 18 parallel to the membrane 12.

Here this force measuring device comprises slots 17 opening onto the free end wall 10a of the stem 10 and a slot 18 opening onto the longitudinal wall of the stem 10.

Thus the two types of slots described hereinabove with reference to the first and second embodiments of the invention can be combined.

This embodiment is particularly suitable when the stem 10 cooperates with a rigid transmission element 21, similar to a stem. Such a mounting of the force measuring device can be encountered in particular in a game control device of the joystick type.

Of course, the embodiments described hereinabove can be combined.

Figure 7:
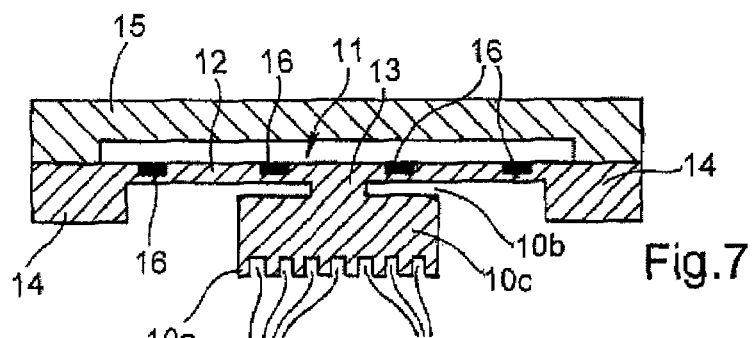
FIG. 7 is a diagrammatic view in cross section of a force measuring device conforming to a fifth embodiment of the invention.

In particular, as clearly illustrated in FIG. 7, in a fourth embodiment, the stem 10 can have an enlarged portion 10c and slots 17 extending perpendicularly to the plane of the membrane 12.

Thus in this embodiment the stem 10 has a first portion 10b of smaller diameter connected to the central area 13 of the membrane 12. This smaller portion 10b is then extended by a portion 10c of increased diameter, achieving improved anchorage of the stem 10 in an element loaded by a force.

Here these two stem portions 10b, 10c are cylindrical and coaxial.

Figure 8:
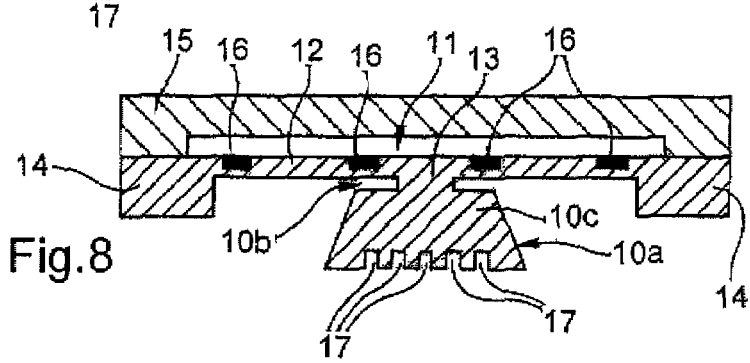
FIG. 8 is a diagrammatic view in cross section of a force measuring device conforming to a sixth embodiment of the invention.

Alternatively, as illustrated in FIG. 8, in a sixth embodiment, the enlarged portion 10c of the stem can also have a frustoconical shape as described hereinabove with reference to FIG. 5.

It is connected by a portion 10b of smaller diameter to the central area 13 of the membrane 12.

Such a structure improves both the transmission of forces tangential and perpendicular to the plane of the deformable membrane 12.

Figure 9:
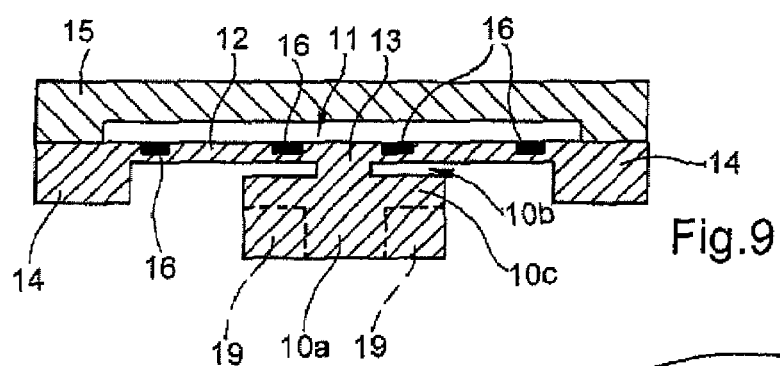
FIG. 9 is a diagrammatic view in cross section of a force measuring device conforming to a seventh embodiment of the invention.

A seventh embodiment of the invention is described next with reference to FIGS. 9 and 10.

As in the embodiments described with reference to FIG. 7, the stem 10 has an enlarged portion 10c attached by a portion 10b of smaller diameter to the central area 13 of the membrane 12.

Figure 10:
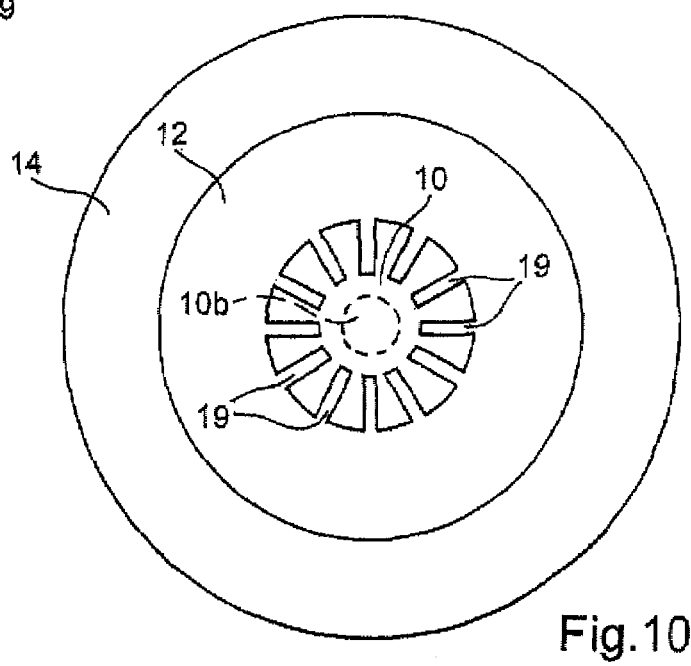
FIG. 10 is a view of the force measuring device from FIG. 9 from below.

Also, the free end 10a comprises slots 19 clearly illustrated in FIG. 10 that open both onto a longitudinal wall of the stem 10 and onto the terminal face of the free end 10a of the stem 10.

The slots 19 are preferably distributed symmetrically with respect to the central longitudinal axis of the stem, and here are distributed regularly over the perimeter of the cylindrical stem 10.

These anchor means 19 improve not only the transmission of tangential forces but also the transmission of a moment to which the stem 10 is subjected.

Of course, the embodiments described hereinabove are in no way limiting and can be combined with each other to improve the anchorage of the stem 10 in an element loaded by a force to be measured.

Moreover, the number and the shape of the slots 17, 17', 18, 19 are in no way limiting.

A first fabrication method for producing slots perpendicular to the membrane 12 is described next with reference to FIGS. 11a to 11k.

The fabrication process described here uses microtechnology techniques.

Figure 11A:
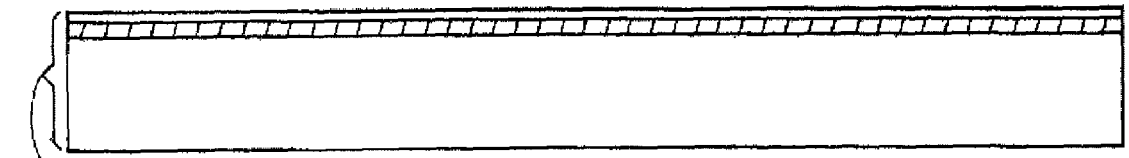
FIGS. 11a to 11k are diagrams illustrating the succession of steps of a method of fabricating a measuring device conforming to the invention.
Figure 11B:
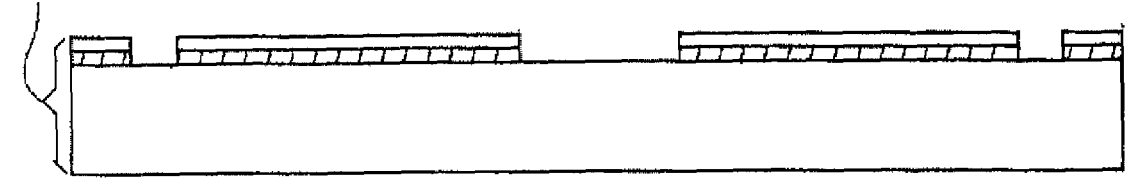

Starting from an SOI (Silicon On Insulator) substrate, as illustrated in FIG. 11a, the first step is to etch the surface layers as illustrated in FIG. 11b.

Figure 11C:
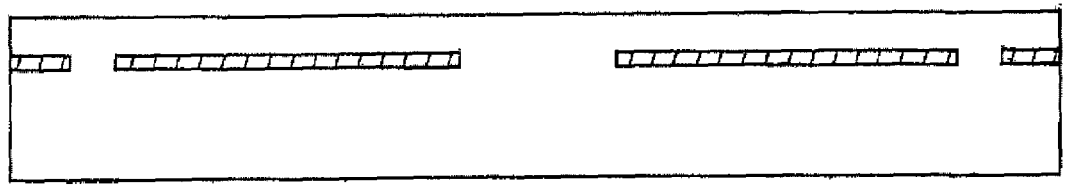

This is followed by epitaxial growth as illustrated in FIG. 11c.

This step grows a layer of monocrystalline silicon from the surface monocrystalline silicon of the SOI substrate.

Figure 11D:
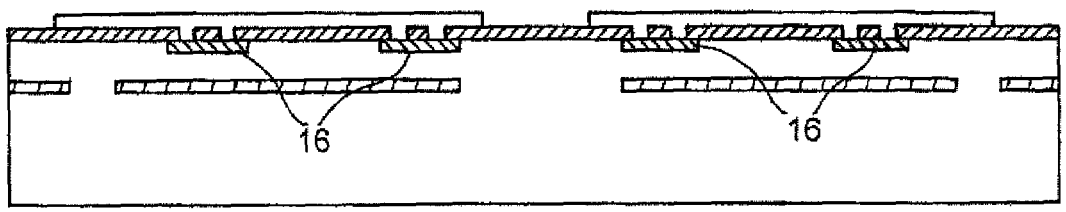

As illustrated in FIG. 11d, there are then formed on an upper face of the substrate resistive gauges forming detection means and conductors for connecting the gauges to form Wheatstone bridges.

Figure 11E:
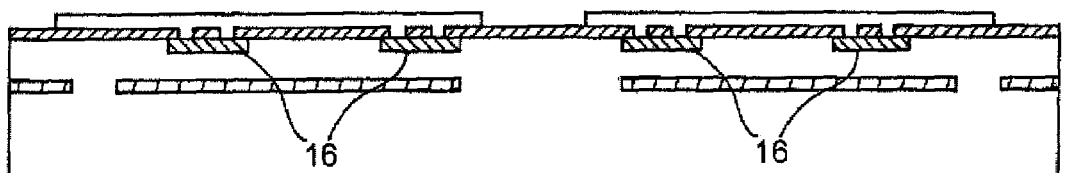

As illustrated in FIG. 11e, a double mask 30, 31 is then produced on the lower face of the substrate.

Figure 11F:
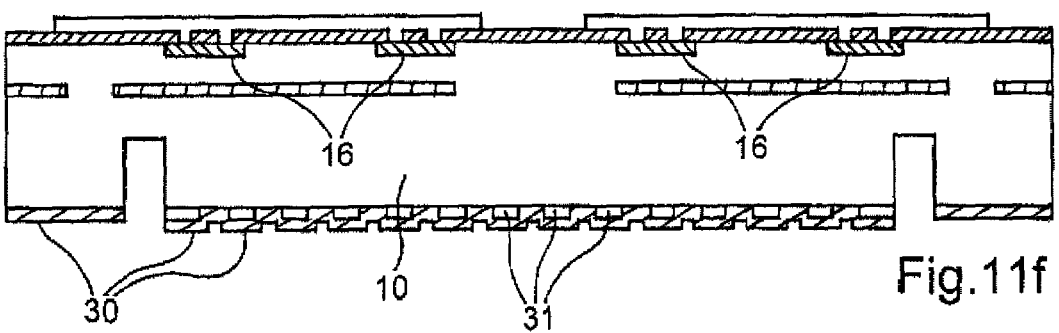

A first deep etch as illustrated in FIG. 11f begins the production of the stem 10.

Figure 11G:
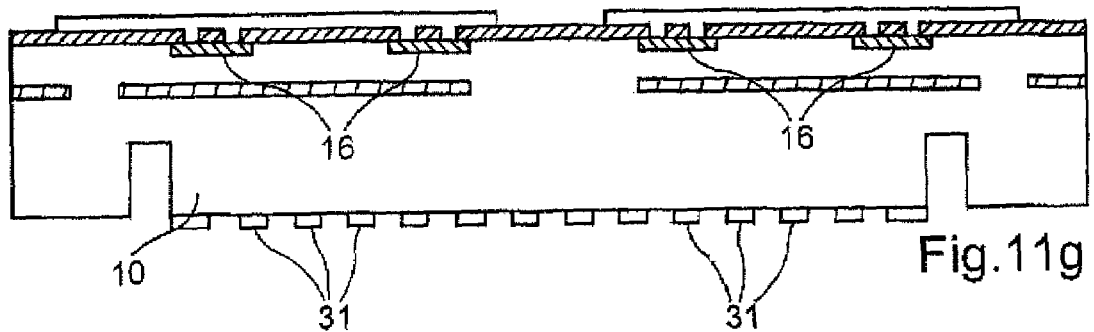

As illustrated in FIG. 11g, the first mask 30 is then eliminated, the second mask 31 remaining present to delimit a series of slots opening onto the free end of the stem 10 being formed.

Here, this second mask 31 forms a series of parallel strips spaced from each other at a regular pitch.

Figure 11H:
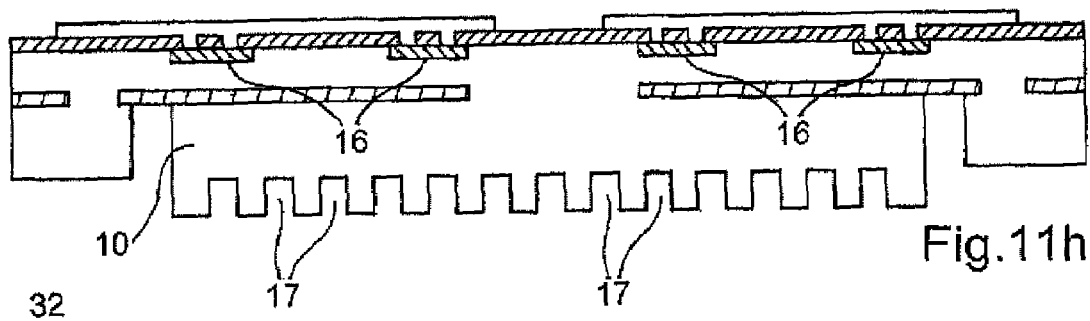

As illustrated in FIG. 11h, a second deep etch is performed and then the second mask 31 is also eliminated. This forms the slots 17.

Figure 11I:
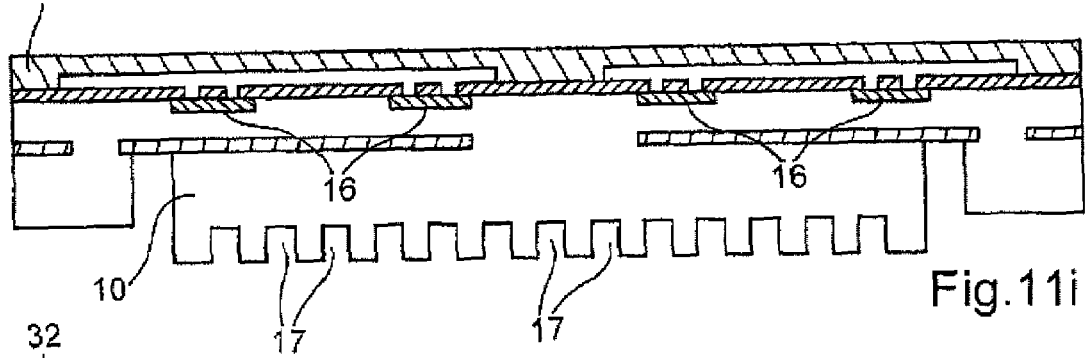

In FIG. 11i, a protection layer 32 is applied to the upper face carrying the detection means and the conductors.

Figure 11J:
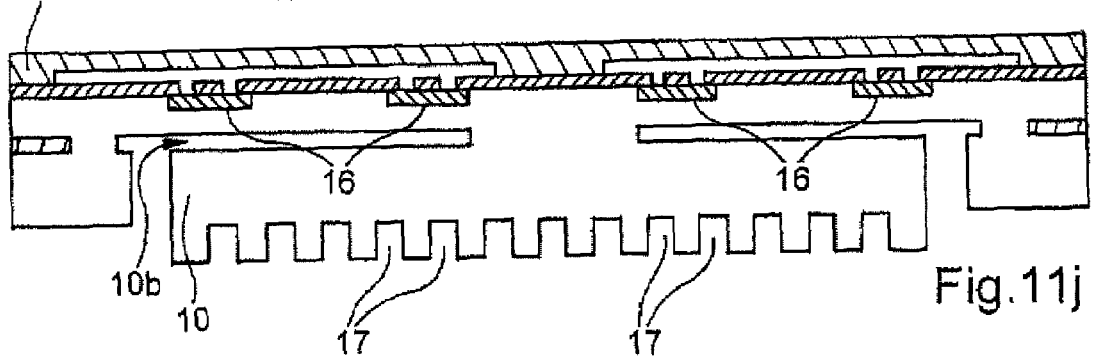

Then, as illustrated in FIG. 11j, the sacrificed oxide layer of the SOI substrate is etched to obtain the smaller-diameter portion 10b of the stem 10.

Figure 11K:
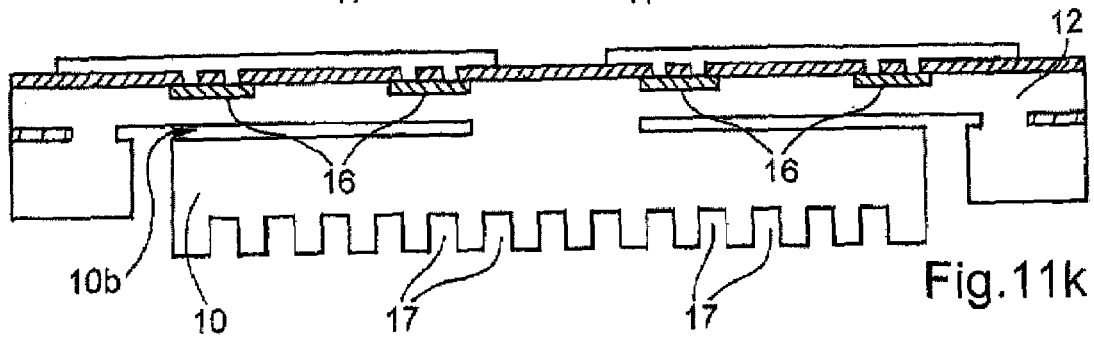

Finally, the protection 32 is removed from the upper face, as illustrated in FIG. 11k.

A second method of fabricating a force measuring device conforming to the invention in which the stem includes a slot extending parallel to the plane of the membrane 12 is described next with reference to FIGS. 12a to 12k.

As before, microtechnology techniques are used.

Figure 12A:
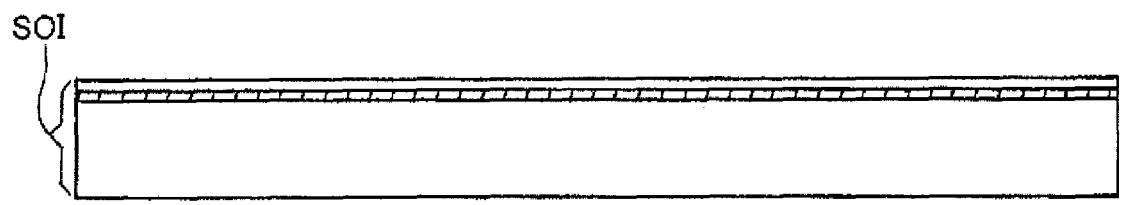
FIGS. 12a to 12k are diagrams illustrating the steps of a method of fabricating a measuring device conforming to another embodiment of the invention.
Figure 12B:
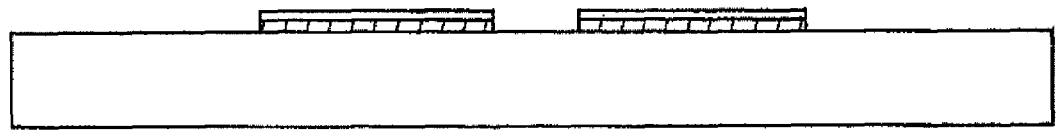
Figure 12C:
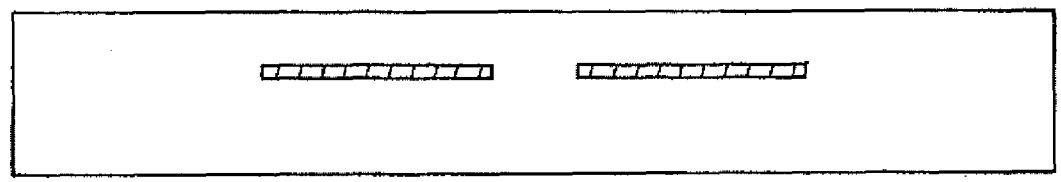

Starting from an SOI substrate as illustrated in FIG. 12a, the surface layers are etched as illustrated in FIG. 12b followed by epitaxial growth as illustrated in FIG. 12c.

Figure 12D:
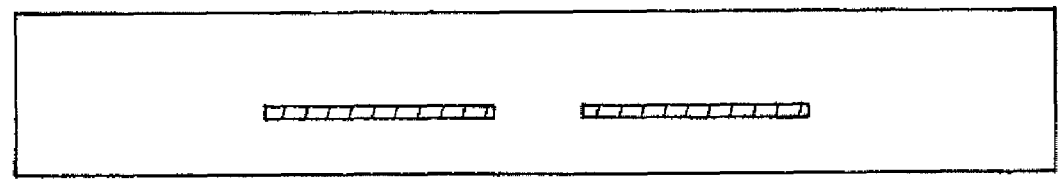

In this fabrication process, the substrate is then inverted, as illustrated in FIG. 12d, the upper face becoming the lower face and vice-versa.

Figure 12E:
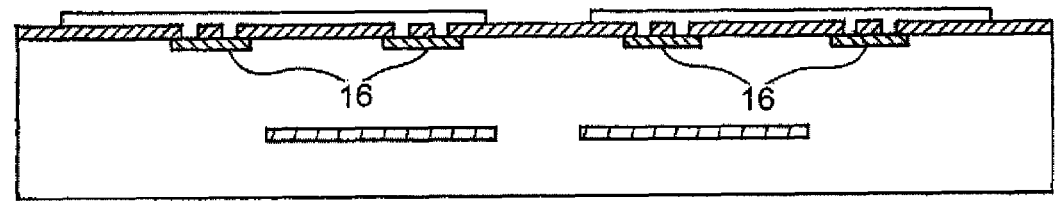

Then, as illustrated in FIG. 12e, the detection means 16 and the electrical connection of these connection means 16 are produced on an upper face of the substrate in known manner.

Figure 12F:
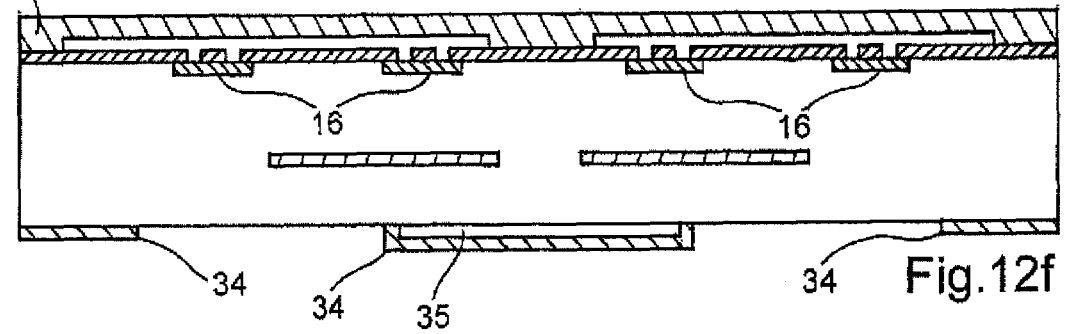

There are then produced as illustrated in FIG. 12f both a protection layer 33 on the upper face of the substrate, for example with the aid of a resin, then a double mask 34, 35 on the lower face of the substrate. This double masking can be effected with the aid of an oxide placed under a resin.

Figure 12G:
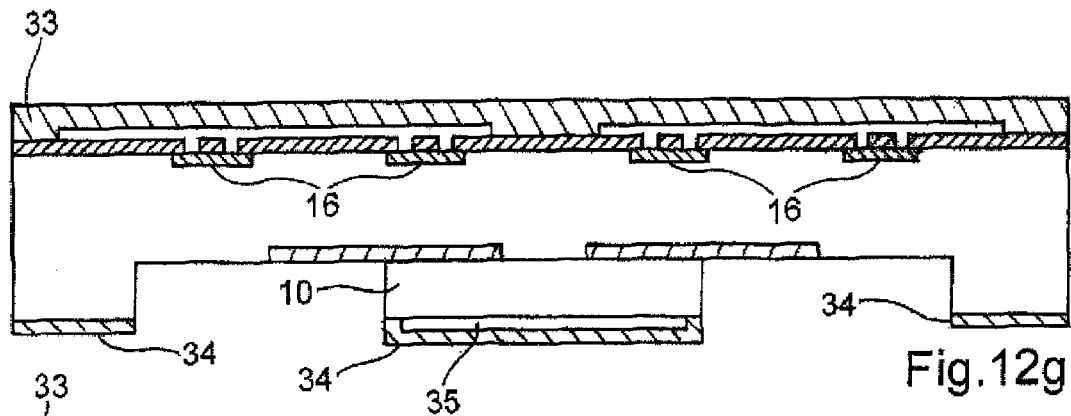

A first deep etch begins the structure of the stem 10 of the sensor as illustrated in FIG. 12g.

Figure 12H:
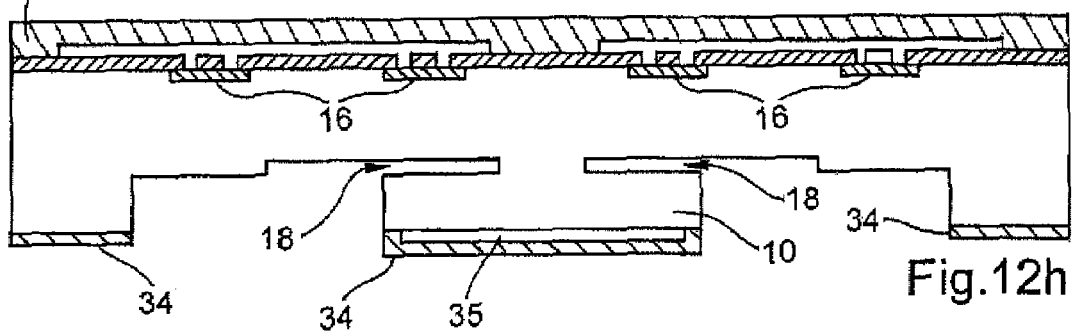

As illustrated in FIG. 12h, wet etching of the lower face of the substrate etches the sacrificed oxide layer to produce a slot 18 extending parallel to the plane of the membrane.

Figure 12I:
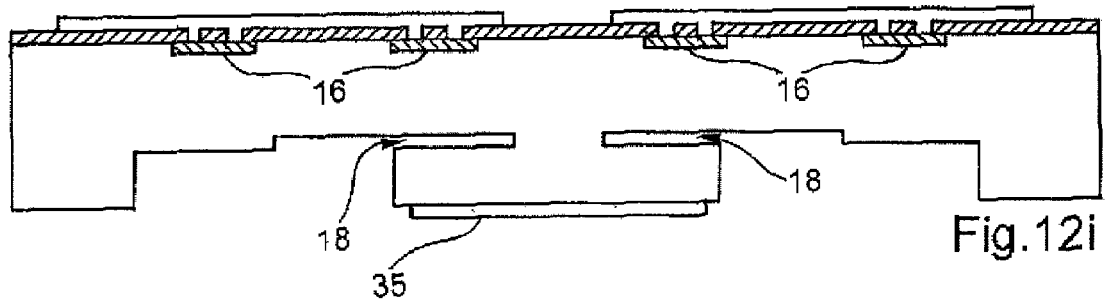

The resin-based first mask 34 is then eliminated along with the protection layer 33 of the upper face of the substrate as illustrated in FIG. 12i.

Figure 12J:
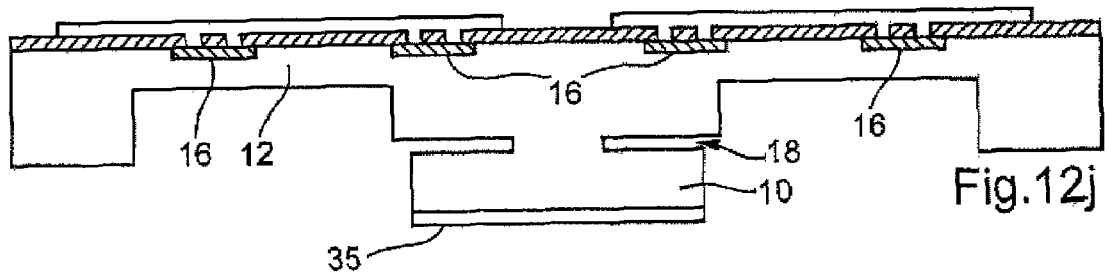

A second deep etch is performed as illustrated in FIG. 12j to produce both the plane of the membrane 12 and the body of the stem 10 in the region of its junction with the membrane 12.

Figure 12K:
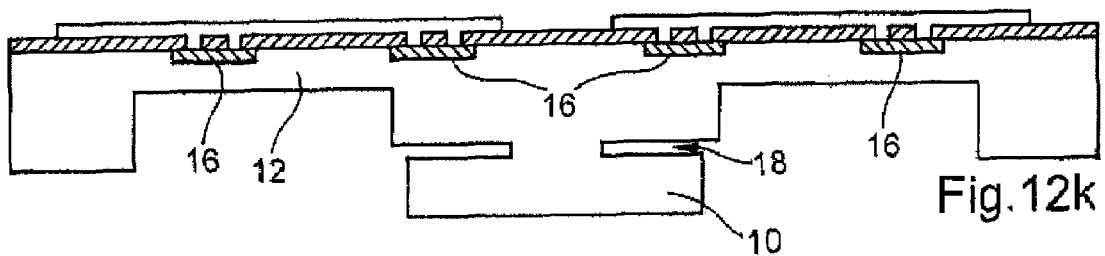

Finally, as illustrated in FIG. 12k, the oxide-based second mask is eliminated.

Of course, the fabrication methods described hereinabove are given by way of nonlimiting example only.

In particular, other more conventional techniques could be used to produce a force measuring device conforming to the invention.

In particular, the various parts of the structure could be produced by conventional machining and then assembled.

Moreover, the force measuring device can be mounted differently on the element loaded by a force and, in particular, a free space can exist between the loaded element and the deformable membrane of the device.

The invention claimed is:

1. A force measuring device comprising a rigid stem connected to a substantially plane deformable membrane, the membrane including detectors for detecting a deformation of the membrane and having a central area and a peripheral area, the stem depending from the central area, the stem including at least a portion integral to the rigid stem and adapted to be in contact with an element to which the force is applied, wherein the integral stem portion includes slots forming an anchor adapted to engage corresponding receiving structure in the element and wherein the membrane and the stem comprise, respectively, portions of a monolithic body.

2. The force measuring device according to claim 1, wherein the slots are perpendicular to the membrane.

3. The force measuring device according to claim 2, wherein the slots comprise concentric circles opening onto a face of a free end of the stem.

4. The force measuring device according to claim 1, wherein the slots are parallel to the membrane.

5. The force measuring device according to claim 1, further comprising slots opening both onto a longitudinal wall of the stem and onto a face of a free end of the stem.

6. The force measuring device according to claim 1, wherein the slots are distributed symmetrically with respect to a central longitudinal axis of the stem.

7. The force measuring device according to claim 1, wherein the anchor further comprises an enlarged portion of the stem.

8. The force measuring device according to claim 7, wherein the enlarged portion has a frustoconical shape, the enlarged portion constituting a free end of the stem.

9. The force measuring device according to claim 1, wherein the integral stem portion is adapted to be buried in the element.

10. The force measuring device according to claim 1, wherein the integral stem portion is configured to intimately engage and intermesh with a receiving area in the element.

11. The force measuring device according to claim 1, wherein the rigid stem is characterized by a cross-sectional area and the membrane is characterized by a surface area, and wherein the cross-sectional area of the rigid stem is less than the surface area of the membrane.

12. The force measuring device according to claim 1, wherein the rigid stem comprises a solid structure.

13. The force measuring device according to claim 1, wherein the membrane and the stem comprise integral regions.

14. The force measuring device according to claim 1, wherein the slots comprise structures opening onto a surface of the stem and descending into an interior region of the stem and defined by a cross-sectional dimension.

15. A force measuring device comprising a rigid stem connected to a substantially plane deformable membrane, the membrane including detectors for detecting a deformation of the membrane, the stem including at least a portion adapted to be in contact with an element to which the force is applied, wherein the stem portion includes slots forming an anchor adapted to cooperate with the element, the slots opening both onto a longitudinal wall of the stem and onto a face of a free end of the stem.

16. A force measuring device comprising a rigid stem connected to a substantially plane deformable membrane, the membrane including detectors for detecting a deformation of the membrane, the stem including at least a portion adapted to be in contact with an element to which the force is applied, wherein the stem portion includes slots forming an anchor adapted to cooperate with the element, wherein the slots are perpendicular to the membrane and comprise concentric circles opening onto a face of a free end of the stem.

17. A force measuring device comprising a rigid stem connected to a substantially plane deformable membrane, the membrane including detectors for detecting a deformation of the membrane, the stem including at least a portion adapted to be in contact with an element to which the force is applied, wherein the stem portion includes slots forming an anchor adapted to cooperate with the element, wherein the anchor comprises an enlarged free end of the stem having a frustoconical shape.

* * * * *